United States Patent

[11] 3,610,263

| [72] | Inventor | Gary Alan Walters |
| | | 2105 W. Broadway, Enid, Okla. 73701 |
| [21] | Appl. No. | 733,572 |
| [22] | Filed | May 31, 1968 |
| [45] | Patented | Oct. 5, 1971 |

[54] FUEL TANK SAFETY VALVE ASSEMBLY
4 Claims, 5 Drawing Figs.

[52] U.S. Cl. .................................................. 137/43,
137/525, 137/533.13, 137/533.15, 220/44, 222/500
[51] Int. Cl. ....................................................... F16k 17/36
[50] Field of Search ............................................ 137/38, 39,
45, 46, 43, 525, 533.13, 533.15; 220/44; 215/56;
141/95, 339; 222/50 O; 123/198-198 F, 136

[56] References Cited
UNITED STATES PATENTS

| 1,060,100 | 4/1913 | King ............................ | 137/38 X |
| 1,342,569 | 6/1920 | Pick ............................ | 137/38 |
| 2,318,424 | 5/1943 | Sattler ......................... | 137/38 |
| 2,528,600 | 11/1950 | Lombard ...................... | 137/43 |
| 2,669,370 | 2/1954 | Royall ......................... | 215/56 X |
| 2,784,865 | 3/1957 | Rieke ........................... | 215/56 X |
| 3,047,178 | 7/1962 | Poitras ......................... | 215/56 |
| 3,391,818 | 7/1968 | Hairston ....................... | 220/44 |
| 3,415,299 | 12/1968 | Hinman ........................ | 251/309 |
| 1,938,138 | 12/1933 | Downs .......................... | 141/339 X |
| 2,439,799 | 4/1948 | Duncan ........................ | 222/500 X |
| 2,919,056 | 12/1959 | Collins ......................... | 222/500 X |
| 3,464,599 | 9/1969 | Meth ............................ | 222/500 X |
| 3,500,843 | 3/1970 | White ........................... | 137/43 |

*Primary Examiner*—Clarence R. Gordon

ABSTRACT: An apparatus to prevent the discharge of fuel from the fuel reservoir inlet or filling spout of an overturned motor vehicle and to prevent the theft of fuel from said reservoir by the siphoning method. The apparatus is basically comprised of a cylindrical housing containing therein a valve seat and valve check, ball valve or the like, and a means for securing the cylindrical housing within the fuel reservoir or filling spout thereto.

PATENTED OCT 5 1971 3,610,263

INVENTOR
Gary A. Walters

FUEL TANK SAFETY VALVE ASSEMBLY

This invention relates to a safety device for motor vehicles and the like and more especially to a form of safety device adapted to be positioned within the fuel tank inlet or filling spout of said vehicle for cutting off the flow of fuel therethrough when the vehicle is upset or overturned.

When a motor vehicle is upset or overturned, very often fuel from the fuel tank escapes through the filling spout. The consequences of such happening are the hazards of explosion and fire possibly resulting in personal injury or death to perhaps already injured or trapped occupants, followed by damage and destruction of property.

In addition to the potential hazard imposed by the escape of fuel following an accident, vehicles left unattended are continually subject to possible loss of fuel by the well known siphoning technique.

The objects of this invention are as follows:

It is an object of this invention to provide a simple and effective means to retard the flow of fuel from the fuel tank inlet of an upset or overturned motor vehicle, thereby decreasing the possibility of explosion and fire and thus reduce personal injury, death and loss of property.

It is an object of this invention to provide a safety device in a form comprising a foraminous member designed to be permanently secured in position within the fuel tank inlet or filling spout so as normally to prevent the effective insertion of a siphoning tube for the unwarranted withdrawal of the contents of the tank.

It is another object of this invention to provide a means for securing such foraminous member in position by means of which the safety device may be easily and quickly mounted in position within the ordinary type of fuel tank inlet or filling spout by any purchaser having little if any mechanical ability and without the aid of special tools.

It is still another object of this invention to provide a safety valve assembly for fuel tanks which has application for all forms of motorized vehicles requiring a fuel tank.

It is a further object of this invention to provide a valve assembly which incorporates a novel securing means of the valve assembly within the gas tank inlet or filling spout that may be depended upon to insure permanence of the valve assembly when positioned within said tank inlet or filling spout.

It is a still further object of this invention to provide a valve assembly that is sturdy and effective, yet simple and inexpensive to manufacture.

It is another object of this invention to provide a valve assembly, the complementary elements of which may be readily molded of various resilient materials which are not adversely effected by motor fuels or water vapor, preferably of neoprene, thus providing a valve assembly that possesses a long service life.

It is still another object of this invention to provide a valve assembly designed to accommodate tank inlets of varying diameters.

Other objects and advantages will appear from the description to follow. In the description reference is made to the accompanying drawings, forming a part hereof, in which there is shown by way of illustration and not of limitation a specific embodiment of my invention.

Figure 1:
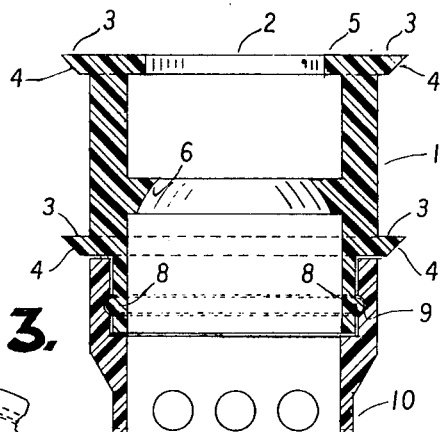
FIG. 1 is a vertical cross-sectional view of a preferred embodiment of the invention showing all parts of the safety device in their assembled position.

Referring more specifically to the drawings, the numeral 1 designates a cylindrical housing adapted to be positioned within the fuel tank inlet or within the tubular filling spout connecting the fuel reservoir with the exterior of the vehicle body, it being understood that the subject of this invention may be used with any type of vehicle propelled by a fluid burning or combustion engine having a fuel reservoir, and may be disposed in any suitable position within the fuel reservoir inlet or filling spout thereto.

The cylindrical housing 1 may be formed in any suitable manner, as by casting or molding, from any tough resilient material that is not adversely effected by motor fuel or water vapor, preferably of neoprene, and of sufficient strength to resist injury when the valve assembly is tapped into position within the fuel tank inlet or filling spout.

The bore 2 extends longitudinally through the cylindrical housing 1. The cylindrical housing 1 is provided with one or more externally projecting circumferential deformable gripping flanges 3. At the outer periphery of the deformable gripping flanges 3 is a beveled edge 4 of approximately 45°, inclined downwardly towards the concentric of the cylindrical housing 1 so as to allow the edge 4 to coincide with the adjacent inner wall of the fuel tank inlet or filling spout upon a slight flexing of the deformable gripping flange 3 as the valve assembly is positioned within the fuel tank inlet or filling spout thereby securing the valve assembly within said location by a press fit.

The cylindrical housing 1 is provided with an integral inwardly projecting axial lip 5 located at the upper most portion of the cylindrical housing 1 to protect the valve seat 6 from damage when the valve assembly is positioned within the fuel tank inlet or filling spout.

The downward facing valve seat 6 projects inwardly towards the concentric of the cylindrical housing 1 and is an integral portion thereof. The valve seat 6 is shaped to coincide with the periphery of the ball valve 7 so as to allow the ball valve 7 to seat on the beveled valve seat 6 closing off the fuel tank inlet when the motor vehicle is upset or overturned and thus restricting the discharge of motor fuel form the tank inlet.

Extending axially from the lower portion of the cylindrical housing 1 is an external radial tongue 8 adapted to project into the circumferential mating groove 9 of the formainous ball valve retainer 10. The outer periphery of the radial tongue 8 is diametrically slightly larger than the circumferential mating groove 9 thus causing sufficient radial expansion of the mating groove 9 and contraction of the radial tongue 8 upon interconnection of the elements 1 and 10 to interlock the valve assembly elements together.

The ball valve retainer 10 is a hollow foraminous cylinder formed in one piece of a tough resilient material that is not adversely effected by motor fuels or water vapor, preferably of neoprene. The lower end of the foraminous ball valve retainer 10 is convexly shaped so as to cradle the ball valve 7 while in its normal resting position, thus allowing the incoming fuel to pass freely through the valve assembly with least appreciable restriction when filling the fuel reservoir.

As indicated in the drawing the ball valve 7 is a sphere constructed of or coated with any suitable material that is not adversely effected by motor fuels or water vapor, preferably of neoprene, and has a density greater than that of the liquid fuel in the fuel tank.

SECOND FORM

Figure 3:
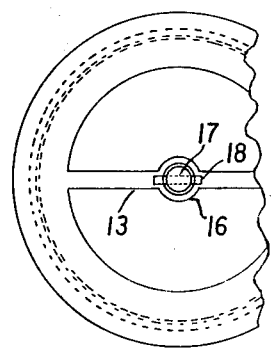
FIG. 3 is a top plan view, partly broken away, of the safety device shown in FIG. 2.
Figure 2:
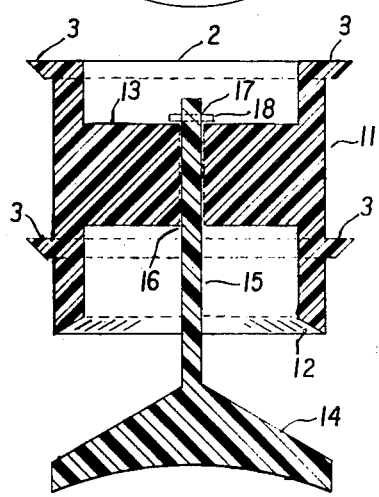
FIG. 2 is a vertical cross-sectional view of another modified form of safety device.

Referring to FIGS. 2 and 3 there will be observed a modified form of this invention adapted to be used in a manner identical to that of the device heretofore described, the structure being slightly different.

This form of the invention is formed of two members 11 and 14 formed, as by casting or molding, from any suitable tough resilient material that is not adversely effected by motor fuel or water vapor, preferably of neoprene, the structure being sturdy enough to resist injury when tapped into position within the fuel tank inlet or filling spout. The cylindrical housing 11 is provided with one or more externally projecting circumferential deformable gripping flanges 3. For the purpose of illustration, the deformable gripping flange 3 is identical to that of the device heretofore described in FIG. 1 and will bear the same reference character.

It will be observed that the base of the cylindrical housing 11 forms a beveled valve seat 12 adapted to coincide with the inclination of the valve member 14 when the vehicle is upset or overturned and thus allowing the valve member 14 being movable by gravity to fall to rest on the valve seat 12 closing off the fuel tank inlet preventing the escape of motor fuel.

Bisecting the bore 2 of the cylindrical housing 11 is one or more thin integral vertical walls 13 adapted to retain the slidably mounted valve member 14 substantially centered on the vertical axis of the cylindrical housing 11. At the vertical axis of the integral wall 13 is formed a hollow cylindrical bore adapted as a valve stem guide 16 extending longitudinally through the integral vertical wall 13. The bore of the valve stem guide 16 is slightly larger in diameter than the valve stem 15 so as to allow the valve stem 15 to slide freely through the valve guide 16.

The valve member 14 may be formed in any suitable shape so long as the inclination of the valve member 14 coincides with the bevel of the valve seat 12. The valve member 14 is constructed of a material that is not adversely effected by motor fuels or water vapor, preferably of neoprene, and has a density greater than that of the liquid fuel in the fuel tank.

Near the end of the valve stem 15 is a small bore 17 perpendicular to the valve stem 15 adapted to retain a valve stem retainer pin 18 by a press fit. The valve stem 15 is of sufficient length so as to allow an ample opening between the valve member 14 and the valve seat 12 with the valve member 14 in the normally open position. The valve retainer pin 18 when pressed into the bore 17 protrudes noticeably from both sides of the valve stem 15 so as to retain the valve member 14 in position directly beneath the valve seat 12.

THIRD FORM

Figure 5:
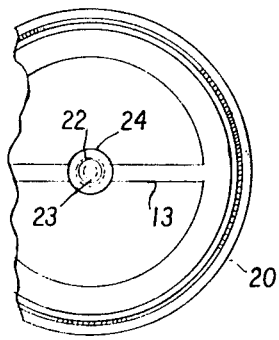
FIG. 5 is a top plan view, partly broken away, of the safety device shown in FIG. 4.
Figure 4:
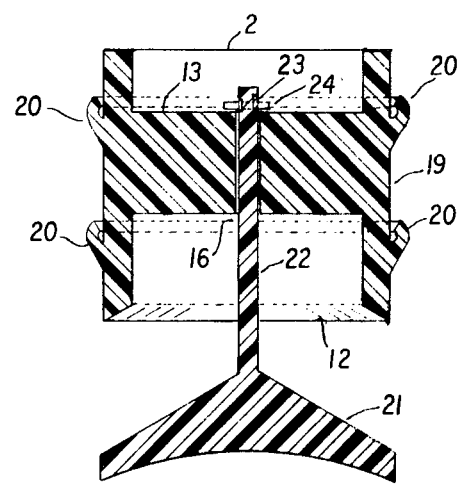
FIG. 4 is a vertical cross-sectional view of still another modified form of safety device showing a variation in the circumferential outwardly extending gripping flange.

Referring now to FIGS. 4 and 5 there will be observed still another form of this invention adapted to operate upon the same principle as the original form of the invention, the structure being slightly different.

The safety device is formed of two members 19 and 21 as by casting or molding from any suitable tough resilient material that is not adversely effected by motor fuel or water vapor, preferably of neoprene, the structure being of sufficient strength to resist injury when tapped into position within the fuel tank inlet or filling spout.

The cylindrical housing 19 is provided with one or more integral, externally projecting, circumferential compressible arcuate tongues 20 adapted to be compressed upon contacting the adjacent inner wall of the fuel tank inlet or filling spout, thus securing the safety device therein by a press fit when the safety device is tapped into position. The arcuate tongue 20 projects outwardly and upwardly from the cylindrical housing 12 so as to facilitate the installation of the device within the fuel tank inlet or filling spout.

It will be observed that the base of the cylindrical housing 19 forms a beveled valve seat 12 adapted to coincide with the inclination of the valve member 21 when the vehicle is upset or overturned thereupon allowing the valve member 21 being movable by gravity to fall to rest on the valve seat 12 closing off the fuel tank inlet preventing the escape of motor fuel. For the purpose of illustration, the valve seat 12 is identical to that of the device heretofore described in FIG. 2 and will bear the same reference character.

Bisecting the bore 2 of the cylindrical housing 19 is one or more thin integral vertical walls 13 adapted to retain the slidably mounted valve member 21 substantially centered on the vertical axis of the cylindrical housing 19. For the purpose of illustration, the bisecting vertical wall 13 is identical to that of the device described in FIG. 2 and will also bear the same reference character.

At the vertical axis of the integral wall 13 is formed a hollow cylindrical bore adapted as a valve stem guide 16 extending longitudinally through the integral vertical wall 13. The bore of the valve stem guide 16 is slightly larger in diameter than the valve stem 22 so as to allow the valve stem 22 to slide freely through the valve guide 16.

The valve member 21 may be formed in any suitable shape so long as the inclination of the valve member 21 coincides with the bevel of the valve seat 12. The valve member 21 is constructed of a material that is not adversely effected by motor fuels and water vapor, preferably of neoprene, and has a density greater than that of the liquid fuel in the fuel tank.

Near the end of the valve stem 22 is located a shallow circumferential groove 23 adapted to receive a snug fitting O-ring 24. The O-ring 24 is constructed of a tough resilient material that is not adversely effected by motor fuels and water vapor, preferably of neoprene, and is suitable to be stretched over the valve stem 22 and positioned in the shallow circumferential groove 23 so as to retain the valve member 21 in its normal open position directly beneath the valve seat 12, it being understood that the valve stem 22 is of sufficient length so as to allow an ample opening between the valve member 21 and the valve seat 12. Upon the motor vehicle being upset or overturned the valve member 21 will freely slide by gravitational pull to the closed position cutting off the fuel inlet and preventing the discharge of fuel therefrom.

I claim:

1. A fuel reservoir safety check valve adapted for a tight slidable insertion into said fuel reservoir inlet or filling spout thereto, comprising a tubular valve body, said tubular valve body having an opening longitudinally therethrough, with an inlet end and an outlet end, means for retaining said tubular valve body within said fuel reservoir inlet or filling spout thereto, an integral downwardly facing valve seat, a valve check, said valve check having a surface thereof adapted to fit said valve seat a foraminous valve check retainer basket, said valve check retainer basket fixedly engaged with said tubular valve body by holding means, said valve check retainer basket being held securely and immovably in place beneath said valve seat and said valve check being movably located within said valve check retainer basket.

2. In a fuel reservoir safety check valve of the type described in claim 1, said means for retaining said tubular valve body within said fuel reservoir inlet or filling spout thereto, comprising one or more circumferential deformable gripping flanges projecting from the exterior of said tubular valve body, the outer periphery of said deformable gripping flange, a beveled edge thereof, inclined downwardly toward the concentric of said tubular valve body.

3. In a fuel reservoir safety check valve of the type described in claim 1, said means for retaining said foraminous valve check retainer with said tubular valve body, comprising an external radial tongue extending axially from the lower portion of said tubular valve body adapted to project into a circumferential mating groove at the interior upper end of said foraminous valve check retainer, so constructed and arranged that upon interconnection said tubular valve body and said valve check retainer will be interlocked together.

4. In a fuel reservoir safety check valve of the type described in claim 1, wherein said valve check is a nonbuoyant sphere constructed of any suitable material not adversely effected by motor fuels and water, preferrably of neoprene, said sphere having a density greater than that of the liquid within said fuel reservoir.